United States Patent [19]

Sakai et al.

[11] Patent Number: 4,491,403
[45] Date of Patent: Jan. 1, 1985

[54] AUTOMATIC FOCUSING OPTICAL APPARATUS

[75] Inventors: Shinji Sakai; Yoshihito Harada, both of Tokyo; Akira Ishizaki; Takashi Kawabata, both of Kanagawa, all of Japan

[73] Assignee: Canon Kabushiki Kaisha, Tokyo, Japan

[21] Appl. No.: 464,979

[22] Filed: Feb. 8, 1983

[30] Foreign Application Priority Data

Feb. 15, 1982 [JP] Japan .................................. 57-22403

[51] Int. Cl.³ ............................................... G03B 3/10
[52] U.S. Cl. .................................... 354/409; 354/402; 354/406
[58] Field of Search ......................... 354/402, 406, 409

[56] References Cited

U.S. PATENT DOCUMENTS

| | | | |
|---|---|---|---|
| 4,253,751 | 3/1981 | Tokutomi et al. | 354/409 X |
| 4,318,598 | 3/1982 | Fukuhara et al. | 354/409 |
| 4,333,716 | 6/1982 | Sakane et al. | 354/406 X |

FOREIGN PATENT DOCUMENTS 50-99729  8/1975  Japan .

*Primary Examiner*—Michael L. Gellner
*Attorney, Agent, or Firm*—Toren, McGeady and Stanger

[57] ABSTRACT

An automatic focusing optical apparatus comprises an automatic focusing device which automatically controls the focal point of an optical system and is arranged to be operatable in such a manner that, once the optical system is focused on an object, the focal point of the optical system is fixed to be unvarying irrespectively of changes in the distance to the object; a display device which is capable of displaying the in-focus and defocus states of the optical system independently of the automatic focusing device; and control means for allowing the display device to display solely the in-focus state when the automatic focusing device fixes the focal point of the optical system to be unvarying irrespectively of changes in the distance to the object after the optical system is once focused on the object.

13 Claims, 1 Drawing Figure

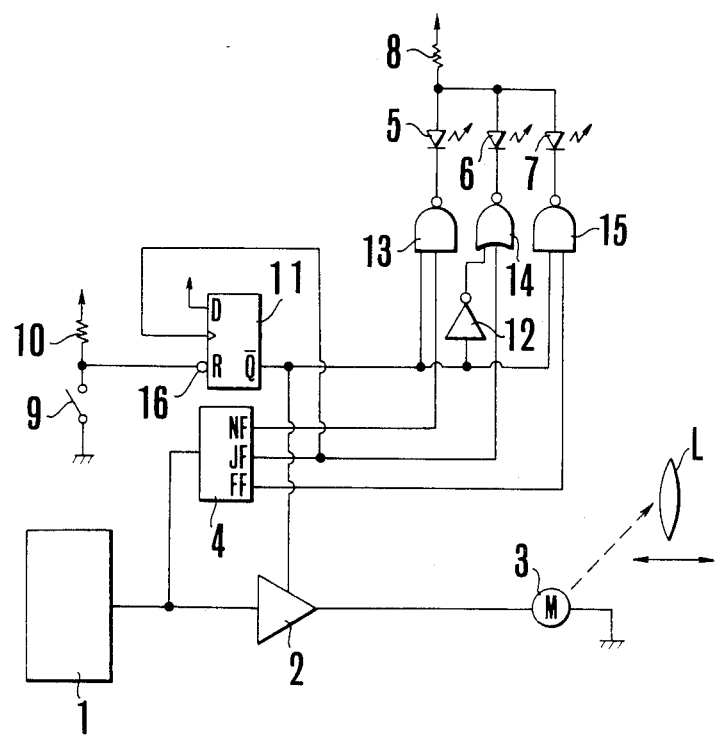

AUTOMATIC FOCUSING OPTICAL APPARATUS

BACKGROUND OF THE INVENTION

1. Field of the Invention

This invention relates to an optical system of a camera having an automatic focusing device and more particularly to an improvement on a display system thereof.

2. Description of the Prior Art

Heretofore many automatic focusing cameras having optical systems with varied kinds of automatic focusing devices have been proposed and put into practice. It is significant for the cameras of this type to be provided with some display device that enables the user of the camera to confirm the focusing state of the lens. In an automatic focusing type single-lens reflex camera adapted for use of interchangeable lenses, the automatic focusing device becomes incapable of performing lens control in cases where an interchangeable lens having no interlocking relation to the automatic focusing device or where a quicker focusing action is necessary for a moving object. In such cases, a manual focusing operation should be performed while observing the focusing state of the lens by the air of such a display device. It is therefore desirable, against such occurrences, to have the above stated display device arranged to be capable of displaying the focusing state of the lens independently of the automatic focusing device.

The prior art cameras of the type having such a combination of an automatic focusing device and a display device include a camera in which, as disclosed in Japanese Laid-Open Patent Application No. Sho 50-99739, an automatic focuisng device is arranged to make the focal point of a photo-taking lens unvarying irrespectively of changes in object's distance after the lens is focused on the object to be photographed, so that a picture having the object in focus can be taken even when the object is positioned away from the middle portion of the picture which is an automatic focus detectable area. In that instance, however, if the display device is arranged to be operatable independently of the automatic focusing device the display by the display device would follow with fidelity the changes in the focusing state of the lens resulting from variations of distance to the object. This would not only confuse the eyesight but also tend to cause the user to miss a good shutter operating chance because the end of the focus adjusting action on the lens by the automatic focusing device is not clearly discernible due to the varying display by the display device.

SUMMARY OF THE INVENTION

It is a general object of the present invention to obviate the above stated disadvantages of the prior art devices resulting from the changes that occurs in the display of the focusing state when the focal point of an optical system is fixed.

It is a more specific object of the invention to provide an automatic focusing optical apparatus comprising an automatic focusing device which automatically controls the focal point of an optical system and is arranged to be operatable in such a manner that, once the optical system is focused on an object, the focal point of the optical system is fixed to be unvarying thereafter in despite of changes in the distance to the object; a display device which is capable of displaying the in-focus and defocus states of the optical system independently of the automatic focusing device; and control means for allowing the display device to display solely the in-focus state when the aut matic focusing device fixes the focal point of the optical system to be unvarying in despite of the changes of distance to the object after the optical system is once focused on the object.

The above and further objects and features of the invention will become apparent from the following detailed description of a preferred embodiment thereof taken in conjunction with the accompanying drawing.

BRIEF DESCRIPTION OF THE DRAWING

The accompanying drawing is a circuit diagram showing the electric circuit arrangement of an embodiment of the invention.

DESCRIPTION OF THE PREFERRED EMBODIMENT

Referring to the accompanying drawing which shows the electric circuit arrangement of a single-lens reflex camera which embodies the present invention and is arranged to permit use of interchangeable lenses, the camera includes a focus detection circuit 1 which can be of any known arrangement. However, in this specific embodiment, the detection circuit 1 must be arranged to produce such outputs that permit discrimination between different focusing states including an in-focus state, a near-focus state and a far-focus state. For example, the focus detection circuit 1 is arranged to produce a positive output for a near-focus state, a negative output for a far-focus state and a zero output for an in-focus state in such a manner as disclosed in a U.S. Pat. No. 4,341,953 and in a Japanese Laid-Open Patent Application No. Sho 55-18652. There is provided a servo amplifier 2 for controlling a lens driving motor 3 in such a way as to adjust a photo-taking lens L to an in-focus position in accordance with the output of the above stated focus detection circuit 1. In this specific embodiment, an automatic focusing device or system is formed by these elements 1, 2 and 3. The photo-taking lens L is interchangeable with another lens. In case where a lens having no transmission mechanism that is required for allowing the lens driving motor 3 to transmit a driving force thereto is mounted on the camera, the lens is not controlled by the motor 3. In such a case, therefore, the user must manually adjust the lens by observing the focusing state of the lens, such as a near-focus, in-focus or far-focus state of the lens through a display device which will be described later herein.

A discrimination circuit 4 discriminates the difference between the in-focus, near-focus and far-focus states from the output of the above stated focus detection circuit 1. The level of output NF of the discrimination circuit 4 becomes high for a near-focus state; that of output JF becomes high for an in-focus state; and that of output FF becomes high for a far-focus state. Light emitting diodes (LED's) 5, 6 and 7 respectively serve to display the near-focus, in-focus and far-focus states. These LED's are controlled by the above status outputs of the discrimination circuit 4. In this specific embodiment, a display device or system is formed by these elements 1, 4, 5, 6 and 7. The camera is further provided with a protection resistor 8; a normally open type switch 9 which is closed at the time of performing an automatic focus adjusting action; a pull-up resistor 10; and a D type flip-flop 11 which is of the reset preference type. The flip-flop 11 is arranged such that: The above stated focus adjusting action is brought to a stop by this flip-flop 11 irrespectively of changes in the object after the lens has reached an in-focus position with the above stated switch 9 once closed and then again opened. The D input terminal of the D flip-flop 11 is arranged to be responsive to a high level input. The reset input terminal R of the flip-flop is arranged to receive through an inverter 16 the low-level or high-level signal produced from the above stated switch 9 according as the switch turns on or off. The clock input terminal of the flip-flop 11 is arranged to receive the JF signal (in-focus signal) of the above stated discrimination circuit 4. The above stated servo amplifier 2 is arranged to receive the $\overline{Q}$ output of the flip-flop 11 and operates only when the level of this output of the flip-flop 11 is high while it does not operate when the level of this output is low. In this case, an automatic focus adjusting action control system is formed by these elements 9, 10, 11 and 16.

A NAND gate 13 receives the $\overline{Q}$ output of the flip-flop 11 and the signal NF of the discrimination circuit 4. The $\overline{Q}$ output of the flip-flop 11 is also received by a NOR gate 14 which receives also an inverted signal from an inverter 12 and the signal JF (an in-focus signal) of the discrimination circuit 4. Another NAND gate 15 receives the $\overline{Q}$ output of the flip-flop 11 and the signal FF (a far-focus signal) of the discrimination circuit 4. The above stated LED's 5, 6 and 7 are respectively connected to the output terminals of these gates 13, 14 and 15. In this embodiment, a display action control system is formed by these elements 12, 13, 14 and 15.

With a power supplied to the circuit arrangement by turning on a power supply switch which is not shown, the output level of the inverter 16 becomes high when the switch 9 is turned on. This causes the flip-flop 11 to be reset and the level of the $\overline{Q}$ output thereof becomes high. The high level of the $\overline{Q}$ output renders the servo amplifier 2 operative. The motor 3 is then controlled in accordance with the output of the focus detection circuit 1 to perform automatic adjustment of the focal point of the photo-taking lens L. Then, the focusing state of the lens L is displayed by the LED's 5 and 7 according to the output of the discrimination circuit 4. When the lens reaches an in-focus position through this control and the level of the signal JF of the discrimination circuit 4 becomes high, the flip-flop 11 is triggered by the high level signal JF of the circuit 4 if at that point of time the level of the reset input R of the flip-flop 11 is low with the switch 9 having been opened. With the flip-flop 11 thus triggered, the level of the $\overline{Q}$ output of the flip-flop 11 becomes low. Accordingly, the servo amplifier is rendered inoperative at this point of time and the automatic focus adjusting action comes to a stop. At the same time, the display of the near-focus or far-focus state by the LED 5 or LED 7 is inhibited. Meanwhile, with the output level of the inverter 12 becoming high, the LED 6 is alone allowed to make a display of the in-focus state.

Further, when the lens once comes to the in-focus position, if the switch 9 either continues closed or is again closed after it has been opened, the above stated termination of the automatic focus adjusting action and the above stated inhibition of the display of the adjusting direction do not take place. In that case, therefore, the focus control continues thereafter following any change in the distance to the object to be photographed. Then, if the switch 9 is opened after that, the termination of the automatic focus adjusting action and the inhibition of the display of the adjusting direction take place when the lens comes to the in-focus position as mentioned in the foregoing.

While a preferred embodiment of the invention has been described, the present invention is not limited to such arrangement. For example, the NOR gate 14 may be replaced with a NAND gate and the $\overline{Q}$ output of the flip-flop 11 may be connected directly to one of the input terminals of the NAND gate. The NAND gates 13 and 15 may be replaced with a NOR gate and the $\overline{Q}$ output of the flip-flop 11 may be supplied to one of the input terminals of the NOR gate through an inverter. With the embodiment modified in such a manner, the LED's 5, 6 and 7 may be arranged to be all fixed either in an extinct state or in a lighted up state by the high level of the signal JF of the circuit 4 when the switch 9 is closed.

In an optical apparatus of the type arranged to be capable of performing automatic adjustment of the focal point of a lens and a display of the focusing state of the lens independently of each other, the arrangement to fix the display in a certain contain irrespectively of changes in the distance to the object and thus to prevent the display from flickering when the automatic focus adjusting action of the lens is locked is beneficial to the user and is of course included in the subject matter of the present invention. Thus, various modifications will be apparent to those skilled in the art without departing from the spirit of the invention.

In accordance with the present invention, as it has been described in detail in the foregoing, a clear display which is not misleading and is easily operatable can be obtained for an automatic focusing type optical apparatus such as an automatic focusing type camera or the like wherein the focal point of the lens can be fixed and unvarying irrespectively of changes in the object's distance after the lens is once focused on the object to be photographed. The invention is therefore highly beneficial to an automatic focusing optical apparatus of the above stated kind.

What we claim:
1. An automatic focuing adjustment control apparatus for an optical system operable in a servo automatic focusing mode in which automatic focusing of the optical system is carried out by a servo operation and a one-shot automatic focusing mode in which the optical system is sharply focused on an object to be photographed, and the optical system is stopped from further movement regardless of a later change in the focusing condition, comprising:
 (A) focus detecting means for detecting in-focus and out-of-focus conditions of said optical system;
 (B) changeover means having a first position for selecting the servo automatic focusing mode and a second position for selecting the one-shot automatic focusing mode;
 (C) focusing means for adjusting the focal point of said optical system, said focusing means arranged to be operated in response to an output of said focus detecting means; and
 (D) control means for controlling the adjustment of driving of said focusing means including:
  (a) first drive means for moving said focusing means in response to the output of said focus detecting means when said changeover means is in the first position;
  (b) memory means for memorizong the output of said focus detecting means which represents the fact that said optical system reaches an in-focus condition;

(c) second drive means for operating when said changeover means is in the second position and arranged to stop movement of said focusing means when said memory means memorizes that the detecting means has detected that said optical system has reached an in-focus condition and to move said focusing means in response to the output of said focus detecting means when said memory means does not memorize that said optical system has reached an in-focus condition; and (d) means for resetting the content of said memory means in response to change of said changeover means to the first position.

2. An apparatus according to claim 1, further comprising:

(A) display means for displaying an in-focus state and an out-of-focus state depending upon the output of said focus detecting means; and (B) control means for driving said display means, including:

(a) third drive means responsive to that output of said memory means representing the focus detection means detecting that said optical system has reached an in-focus condition for causing said display means to present a display of the in-focus state.

3. An apparatus according to claim 1 or 2, wherein said focus detecting means is arranged to produce signals which permit discrimination between an in-focus state, a near-focus state and a far-focus state.

4. An apparatus according to claim 2, wherein said display means includes display elements for displaying an in-focus state and defocus states.

5. An apparatus according to claim 4, wherein said focusing means includes:

amplification means for amplifying the output of said focus detection means, said amplification means being arranged to become operative or inoperative in response to said control means; and driving means for driving said optical system according to the output of said amplification means.

6. An apparatus according to claim 5, wherein said driving means includes a motor.

7. An automatic focusing adjustment control apparatus for an optical system operable in a servo automatic focusing mode in which automatic focusing of the optical system is carried out by a servo operation and a one-shot automatic focusing mode in which the optical system is sharply focused on an object to be photographed and thereater, regardless of a later change in the focusing condition movement of the optical system is stopped, including:

(A) focus detecting means for detecting in-focus and out-of-focus conditions of said optical system;

(B) changeover means having a first position for selecting the servo automatic focusing mode and a second position for selecting the one-shot automatic focusing mode;

(C) focusing means for adjusting the focal point of said optical system, said focusing means being arranged to be operated according to an output of said focus detecting means;

(D) memory means for memorizing the fact that said focus detecting means has detected that said optical system has become in focus, said memory means having a first sate for memorizing said fact and a second state for not memorizing said fact;

(E) stopping means for stopping movement of said focusing means despite the output of said focus detecting means when said changeover means is in the second position and said memory means is in the first state; and (F) resetting means responsive to change of said changeover means to the first position for resetting said memory means to the second state despite the output of said focus detecting means.

8. An apparatus according to claim 2, further including:

(A) display means arranged to be driven in response to the output of said focus detecting means so that an in-focus state and an out-of-focus state are selectively displayed; and (B) control means for driving said displaying means, including:

(a) means for causing said display means to display the in-focus state despite the output of said focus detecting means when movement of said focusing means is stopped by said stopping means.

9. An apparatus according to claim 7, wherein said focus detecting means is arranged to produce signals when permit discrimination between an in-focus state, a near-focus state and a far-focus state.

10. An apparatus according to claim 8, wherein said display means includes display elements for displaying an in-focus state and defocus states.

11. An apparatus according to claim 8, wherein said focusing means includes:

amplification means for amplifying the output of said focus detection means, said amplification means being arranged to become operative or inoperative according to the presence or absence of a driving signal; and driving means for driving said optical system according to the output of said amplification means.

12. An apparatus according to claim 11, wherein said stopping means is arranged to produce said driving signal for said amplification means.

13. An apparatus as in claim 11, wherein said driving means includes a motor.

* * * * *